INVENTOR.
CHARLES M. BARNES.
BY
Sheldon F. Raizes
ATTORNEY

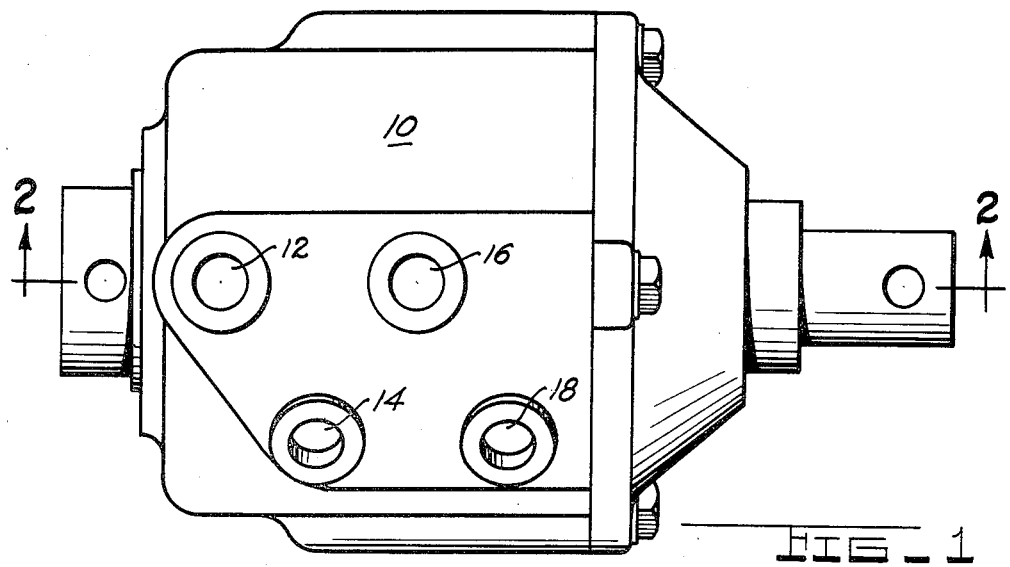
FIG_1
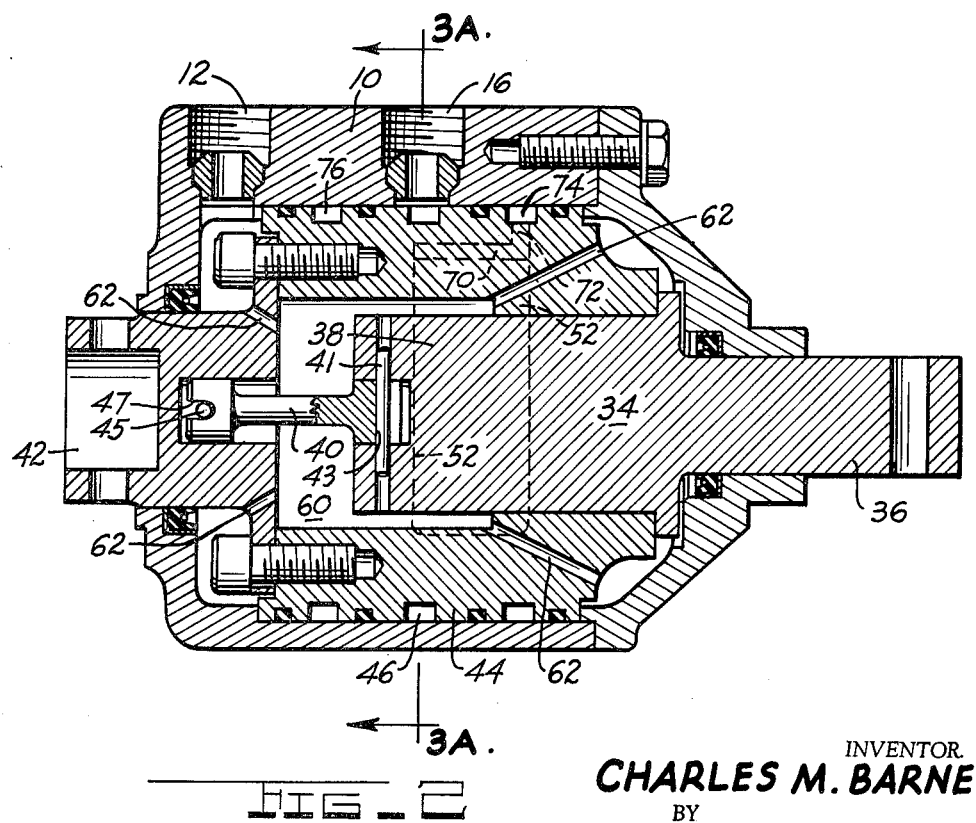
FIG_2
INVENTOR.
CHARLES M. BARNES.
BY
*Sheldon F. Raige*
ATTORNEY.

INVENTOR.
CHARLES M. BARNES.

United States Patent Office 3,223,119
Patented Dec. 14, 1965

3,223,119
POWER AMPLIFIER
Charles M. Barnes, St. Joseph, Mich., assignor to The Bendix Corporation, St. Joseph, Mich., a corporation of Delaware
Filed Dec. 6, 1962, Ser. No. 242,874
4 Claims. (Cl. 137—596)

This invention concerns a valve, and more particularly a valve for operating a fluid motor.

One of the objects of this invention is to provide a valve for use in a fluid system for increasing fluid pressure therein.

Another object of this invention is to provide a fluid system with a valve for increasing fluid pressure for operating a fluid motor.

Still another object of the invention is to provide a power steering system with a valve for increasing fluid pressure for operating a fluid motor which in turn controls steering of a vehicle.

A further object of the invention is to provide a power steering system with a valve for increasing fluid pressure for operating a fluid motor which in turn controls steering of a vehicle wherein pure mechanical reaction or combined mechanical and fluid pressure reaction are transferred through a portion of the valve to a steering wheel to enable a vehicle operator to sense steering "feel" for controlling steering.

A still further object of the invention is to provide a power steering system with a rotary valve which is column mounted or integral with steering gearing mechanism.

An overall object of this invention is to provide a power steering system with a valve which increases fluid pressure for operating a power cylinder and is economical, efficient and simple to assemble.

The above and other objects and features of the invention will appear more fully hereinafter from a consideration of the following description, taken in conjunction with the accompanying drawings wherein an embodiment of the invention is illustrated by way of example only and in which:

FIGURE 1 is a plan view of a housing for the valve assembly;

FIGURE 2 is a view taken along section line 2—2 of FIGURE 1;

Figure 4:
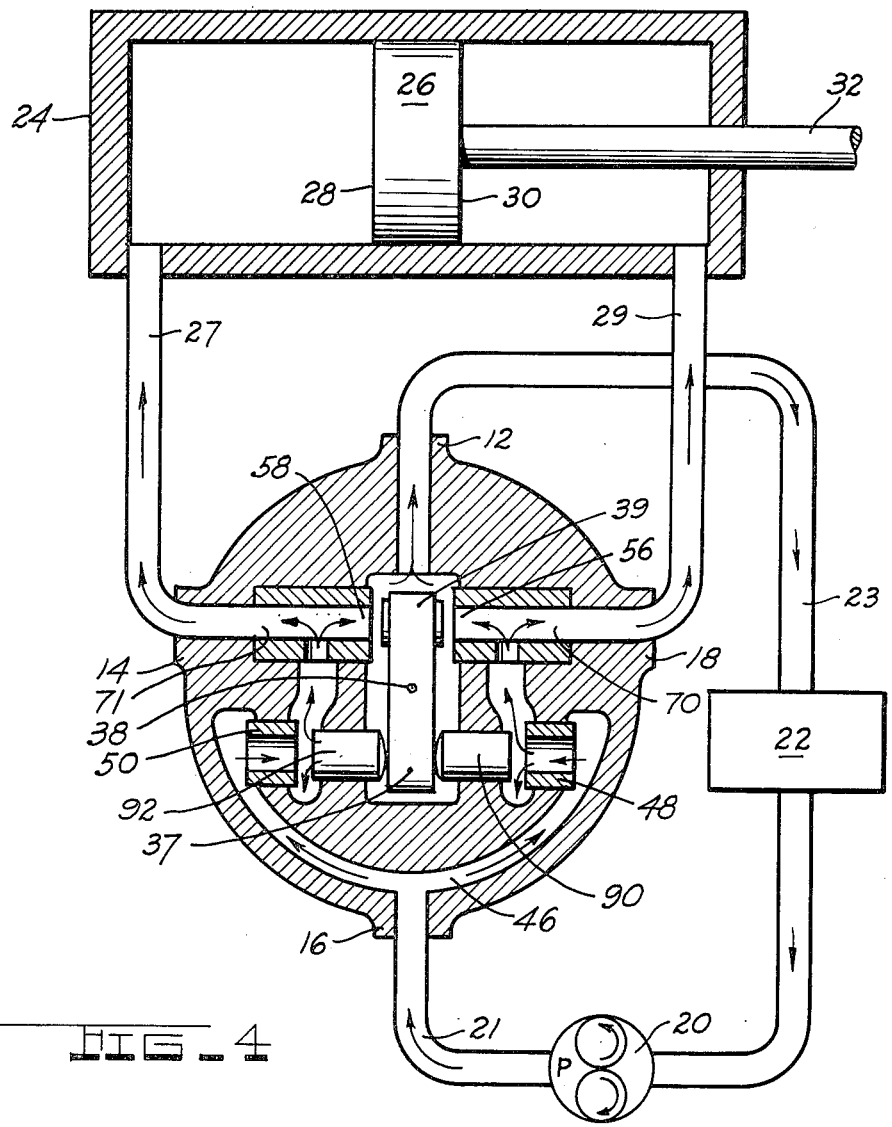
FIGURE 4 is a schematic illustrating the valve connected to a power cylinder.

Referring to FIGURES 1 and 4, a housing 10 is provided with a reservoir port 12, a motor port 14, an inlet port 16 and another motor port 18. The inlet port 16 is connected to a pump 20 by conduit 21, reservoir port 12 is connected to a reservoir 22, by conduit 23, and motor ports 14 and 18 are connected by conduits 27 and 29, respectively, to a fluid chamber of a power cylinder 24 having a piston 26 slidable therein. A stem 32 of the piston 26 transfers movement of the piston to a steering knuckle (not shown).

Figure 3A:
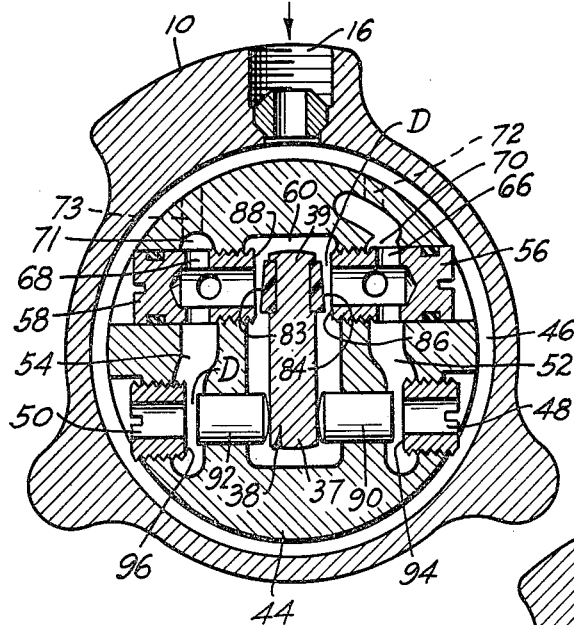
FIGURE 3A is a view taken along section line 3A—3A of FIGURE 1 illustrating the valve during cruising position.

Referring to FIGURES 2 and 3A, an input rotor 34 has a stem 36 which is operatively connected to a steering wheel (not shown) of the vehicle and has at its other end a flapper valve 38. A torsion bar 40 is connected at one end to the input rotor 34 by a pin 41 and a slot 43 connection and is connected at its other end to an output member 42 by a pin 45 and slot 47 connection, which output member is operatively connected to a gearing mechanism for steering a vehicle. A cylindrical sleeve member 44 is rigidly attached to or may be integral with the output member 42 and rotates relative to the housing 10. The input rotor is rotatable relative to the housing 10 and is rotatable relative to the output member 42 and cyindrical sleeve member 44 when there is a resistance to turning of the output member by the input rotor through the torsion bar connection.

The rotatable sleeve member 44 has an annular groove 46 communicating with the inlet port 16. Fluid is conducted from the annular passage 46 through inlet orifices 48 and 50 to chambers 52 and 54, respectively and then through outlet orifices 56 and 58 to a return chamber 60 which is communicated to the reservoir by passages 62, reservoir port 12 and conduit 23 (FIGURE 4). The orifices 56 and 58 have notches 66 and 68 therein for communication with work ports 70 and 71. Work port 70 is communicated with the face 30 of the piston 26 by passage 72 which leads to annular groove 74; groove 74; motor port 18; and conduit 29. Work port 71 is communicated with the other face 28 of the piston 26 by passage 73 which leads to annular groove 76; groove 76; motor port 14; and conduit 27. Resilient pads 83 and 84 are connected to the flapper valve 38 at one lateral end 39 thereof for engaging seats 86 and 88, respectively, of the outlet orifice members 56 and 58, respectively. The other end 37 of the flapper valve engages slidable pins 90 and 92 for seating the same on seats 94 and 96 of the inlet orifices 48 and 50, respectively.

The gaps D between the pads 83, 84 and their respective seats and the pins 90, 92 and their respective seats serve as an orifice. As the gaps D increase, the pressure drop thereacross decreases and as the gaps D decrease, the pressure drop thereacross increases. Orifice members 48, 50, 56 and 58 are connected to the rotatable sleeve member 44 by threads and therefore are adjustable for movement inwardly or outwardly along each of its respective axes. The orifices are so designed and the gaps D are such that during neutral position of the flapper valve as illustrated in FIGURE 3A, the pressures communicated to work ports 70 and 71 are in the same proportion as the areas 28 and 30 of the piston faces resulting in equal total force being exerted on each face of the piston 26 maintaining the piston in a stable position.

Figure 3B:
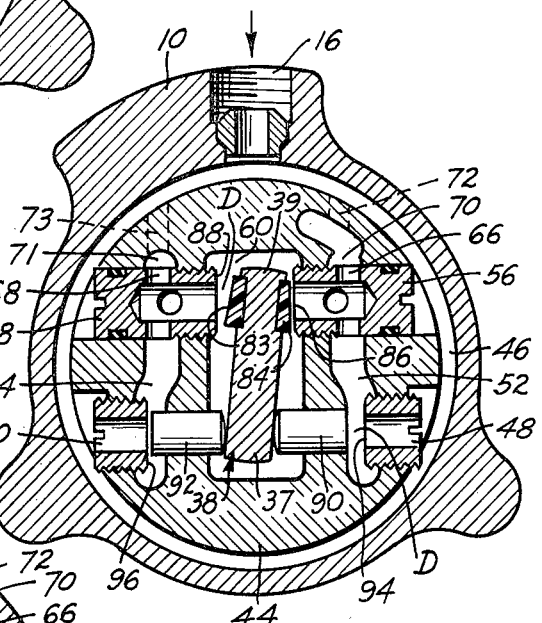
FIGURE 3B is a view illustrating the valve during right turn position.

In operation and referring to FIGURE 3B, if it is desired to make a right hand turn, input rotor 34 and the flapper valve 38 will be turned clockwise moving pad 84 closer to its seat 86 and restricting flow from the chamber 52 through the outlet orifice 56 to the return chamber 60 while at the same time the other end 37 of the flapper valve 38 moves the slidable pin 92 toward its seat 96 restricting flow through the inlet orifice 50 into the chamber 54. At the same time, the pad 83 is moving away from its seat 88 and providing a larger opening for and less empedance to fluid flow from the work port 71 through the outlet orifice 58 into return chamber 60 and the pin 90 is forced toward the other end of the flapper valve by the presure acting on the end area of the piston providing a larger opening for and less impedance to fluid flow from the inlet groove 46 through the inlet orifice 48 into chamber 52. Pressure builds up in passage 46, chamber 52, work port 70 and on the face 30 of piston 26 which creates an unbalance of forces acting on the piston 26 resulting in the movement of piston 26 to the left. Fluid on the other side of the piston is communicated to the reservoir by conduit 27, passage 73, work port 71, outlet orifice 58, return chamber 60, passages 62 and conduit 23. In the meantime, the pressure acting on the pad 84 and the pin 92 will tend to turn the flapper valve in the opposite direction with the pressure acting on pin 90 helping to turn the flapper valve. The end areas 91 and 93 of the pins 90 and 92, respectively, may be so proportioned to their respective orifice openings and to the openings of outlet orifices 56 and 58 that there will be no resultant of hydraulic forces acting on the flapper valve resulting in pure torsion bar reaction for driver steering feel, or may be so proportioned that the resultant of hydraulic forces acts on the flapper valve to turn the flapper valve back to neutral resulting in a combined torsion bar and hydraulic reaction for driver steering feel. Obviously, in the latter condition, the more the flapper valve 38 is turned, the greater the pressure will be acting on the valve 38 counteracting such turning moment.

Figure 3C:
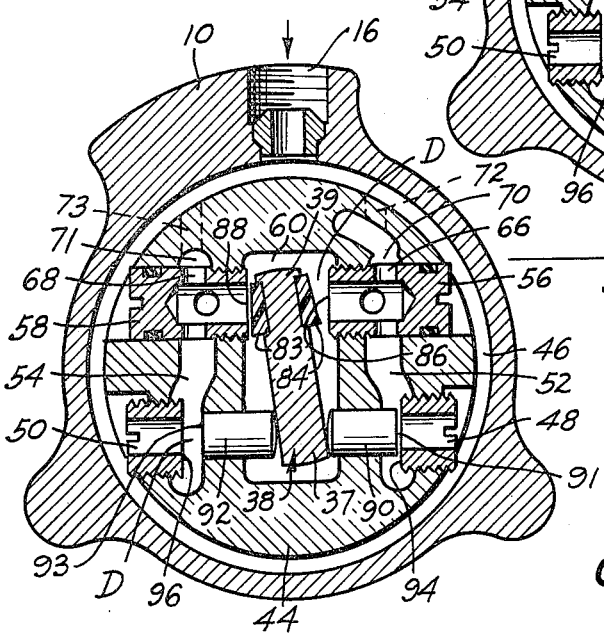
FIGURE 3C is a view illustrating the valve during left turn position.

When it is desired to make a left turn, FIGURE 3C, the flapper valve will be turned counterclockwise with the pad 83 restricting flow from the chamber 50 into the return chamber 60 through the outlet orifice 58 and will also push slidable pin 90 toward its seat 94 to restrict flow of fluid through the inlet orifice 48 into chamber 52. Simultaneously, the pad 84 moves away from its seat 86 providing a larger opening for and less impedance to flow from the work port 70 through the orifice 56 to the return chamber 60 and also the pin 92 will be moved toward the right against the flapper valve end 38 providing a larger opening for and less impedance to fluid flow from the inlet groove 46 through the orifice 50 into chamber 54 and the work port 71. Therefore, pressure will be increased in the chamber 54, port 71, passage 73 and the force acting on the face 28 will be greater than the force acting on the face 30 to move the piston to the right. Again steering feel may be effected by the resultant of all hydraulic forces acting on the flapper valve tending to turn the flapper valve in the opposite direction.

If there is a power failure or the desired steering requirement exceeds the power of the system, mechanical steering is possible. For example, suppose a left turn is being made: relative movement between the flapper valve and the cylindrical sleeve will last until the resilient pad 84 engages its seat 88 and pin 90 will engage its seat 94 sealing off outlet orifice 58 and inlet orifice 48. Further turning effort acting on the input rotor will result in rotation of the input rotor, the cylindrical sleeve and output member as a unit due to the flapper valve bearing directly and indirectly on the outlet orifice 58 and inlet orifice 48, respectively. Thus, a turn is effected mechanically. Constructing the pads 83 and 84 as resilient members eliminates the necessity of precision construction to effect sealing of one inlet orifice and one outlet orifice during a "hard" turn since the resilient pads are designed to engage their respective seats before the pins engage their respective seats. Any further necessary movement of the pins to engage their respective seats is possible due to the resiliency of the pads. Obviously, either the pins or pads or both could be resilient to effect the same result.

When the operator has turned the vehicle the desired degree, he merely holds the wheel at a fixed position while the output member and cylindrical sleeve move relative to the input rotor until the relative positions therebetween results in the flapper valve reaching a neutral position at which time there is no stress in the torsion bar. When the flapper valve is at neutral position, the wheels will be automatically maintained at the desired turning angle. When it is desired to turn the wheels from this maintained position the steering wheel is then turned in the opposite direction thereby turning the flapper valve in the opposite direction and relative to the cylinder sleeve to actuate the piston to move in the opposite direction back to the desired cruising steering angle. Obviously, the rate of turning will depend upon the degree of varying gaps D by the flapper valve. Different characteristics for flow and pressure may be obtained by changing the sizes of the orifices and also adjusting the axial position of the orifices.

Thus, it can be seen that the above mentioned objects and others have been readily achieved and a compact and simple and efficient valve has been provided for use in a power steering system.

Although this invention has been illustrated and described in connection with a specific embodiment, numerous other adaptations of the invention will become apparent to those skilled in the art from the description in conjunction with the accompanying claims whereby the same or substantially the same results may be obtained.

I claim:

1. A valve comprising: a housing having an inlet, an outlet, and two working ports; a return chamber communicated with said outlet; first passage means connecting said inlet with said return chamber and one of said working ports; second passage means connecting said inlet with said return chamber and the other of said working ports; each passage means having an inlet orifice and an outlet orifice; each inlet orifice being located between its respective outlet orifice and said inlet and each outlet orifice being located between its respective inlet orifice and said return chamber; each of said working ports being connected to its respective passage means between its respective inlet orifice and its respective outlet orifice; each outlet orifice opening into said return chamber; a rotatable flapper valve member located in said return chamber and having one end located between said inlet orifices and its other end located between said outlet orifices; a pair of slidable pins on opposite sides of said one end of said flapper valve member; each of said pins having one end extending into said return chamber for engaging said one end of said flapper valve member and its other end extending into a respective one of said passage means adjacent the downstream side of a respective one of said inlet orifices for impeding flow therethrough when said one end of said flapper valve member is rotated towards a respective one of said inlet orifices, said other end of said flapper valve member having means coacting with the downstream side of said outlet orifices for impeding flow therethrough from a respective one of said passage means to said return chamber when said other end of said flapper valve member is rotated towards a respective one of said outlet orifices; whereby upon rotation of said flapper valve member in one direction, flow through the inlet orifice of said first passage means and flow through the outlet orifice of the second passage means will be impeded resulting in increased pressure at said second passage means, and when said flapper valve member is rotated in the opposite direction, flow through the inlet orifice of said second passage means and flow through the outlet orifice of said first passage means is impeded resulting in increased pressure at said first passage means.

2. The structure as recited in claim 1 wherein said inlet orifices and said outlet orifices are provided with means for adjusting the distance between said flapper valve member ends and said orifices.

3. A valve comprising: a housing having an inlet, an outlet, and two working ports; a first member rotatable within said housing having a return chamber therein, conduit means connecting said return chamber to said outlet, first passage means connecting said inlet with said return chamber and one of said working ports, and second passage means connecting said inlet with said return chamber and the other of said working ports; each passage means having an inlet orifice and an outlet orifice; each inlet orifice being located between its respective outlet orifice and said inlet and each outlet orifice being located between its respective inlet orifice and said return chamber; each of said working ports being connected to its respective passage means between its respective inlet orifice and its respective outlet orifice; each outlet orifice opening into said return chamber; a second member rotatable within said housing and within said first rotatable member having a flapper valve portion located in said return chamber; said flapper valve portion having one end located between said inlet orifices and its other end located between said outlet orifices; a pair of slidable pins on opposite sides of said one end of said flapper valve portion; each of said pins having one end extending into said return chamber for engaging said one end of said flapper valve portion and its other end extending into a respective one of said passage means adjacent the downstream side of a respective one of said inlet orifices for impeding flow therethrough when said one end of said flapper valve portion is rotated towards a respective one of said inlet orifices, said other end of said flapper valve portion having means coacting with the downstream side of said outlet orifices for impeding flow therethrough from a respective one of said passage means to said return chamber when said other end of said flapper valve portion is rotated towards a respective one of said outlet orifices; whereby upon rotation of said second rotatable member in one direction, flow through the inlet orifice of said first passage means and flow through the outlet orifice of the second passage means will be impeded resulting in increased pressure at said second passage means, and when said second rotatable member is rotated in the opposite direction, flow through the inlet orifice of said second passage means and flow through the outlet orifice of said first passage means is impeded resulting in increased pressure at said first passage means.

4. The structure as recited in claim 3 wherein said inlet orifices and said outlet orifices are provided with means for adjusting the distance between said ends of said flapper valve portion and said orifices.

References Cited by the Examiner
UNITED STATES PATENTS

| | | | |
|---|---|---|---|
| 2,018,018 | 10/1935 | Garllus | 91—457 |
| 2,554,843 | 5/1951 | Staude | 91—146 |
| 2,881,740 | 4/1959 | Ensinger | 91—455 |
| 2,924,200 | 2/1960 | Hanna | 91—464 |
| 2,952,247 | 9/1960 | Swanson | 137—596.2 |
| 3,029,830 | 4/1962 | Klever | 137—625.62 |
| 3,032,014 | 5/1962 | Jablonsky | 91—457 |

SAMUEL LEVINE, *Primary Examiner.*